United States Patent
Jarrard et al.

(10) Patent No.: US 6,304,078 B1
(45) Date of Patent: Oct. 16, 2001

(54) LINEAR POSITION SENSOR

(75) Inventors: Craig A. Jarrard, Middlebury, IN (US); John S. Duesler, Buchanan, MI (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/657,498

(22) Filed: Sep. 8, 2000

Related U.S. Application Data

(63) Continuation-in-part of application No. 09/208,296, filed on Dec. 9, 1998.

(51) Int. Cl.$^7$ .................................................. G01B 7/14
(52) U.S. Cl. ............................ 324/207.2; 324/207.22; 324/207.24
(58) Field of Search ...................... 324/207.2, 207.25, 324/207.21, 207.22, 207.24; 338/32 R, 32 M

(56) References Cited

U.S. PATENT DOCUMENTS 5,493,216 * 2/1996 Asa ...................................... 324/207.2
5,557,493 * 9/1996 Ross ...................................... 361/149
5,757,179 5/1998 McCurley .

FOREIGN PATENT DOCUMENTS

| 19715991A | 2/1998 | (DE) . |
| 0558364A1 | 2/1993 | (EP) . |
| 0907068A1 | 4/1999 | (EP) . |

* cited by examiner

Primary Examiner—Safet Metjahic
Assistant Examiner—Subhash Zaveri
(74) Attorney, Agent, or Firm—Mark P. Bourgeois; Mark W. Borgman

(57) ABSTRACT

A non-contacting linear position sensor having bipolar tapered magnets. A pair of magnets are positioned adjacent each other and attached to a movable object. Each magnet has a central portion that is thinner than both ends of the magnets. A pair of pole pieces has ends that are arranged spaced apart in parallel relationship about the central portion. The other ends of the pole pieces are located spaced apart with a magnetic flux sensor located between. The magnetic flux sensor senses a variable magnetic field representative of the position of the attached movable object as the magnets move. The magnets have opposite polarities on either sides of the central portion.

18 Claims, 2 Drawing Sheets

LINEAR POSITION SENSOR

CROSS REFERENCE TO RELATED AND CO-PENDING APPLICATIONS

This application is a Continuation in Part of U.S. patent application Ser. No. 09/208,296 filed Dec. 9, 1998 titled, Non Contacting Position Sensor using Bi-polar Tapered Magnets and is herein incorporated by reference.

This application is related to U.S. patent application Ser. No. 09/335,546 filed Jun. 18, 1999 titled, Non Contacting Position Sensor using Radial Bi-polar Tapered Magnets and is herein incorporated by reference.

BACKGROUND OF THE INVENTION

I. Technical Field

This invention relates, in general, to non-contacting position sensors. More particularly, this invention relates to the magnetic configuration of non-contacting position sensors utilizing Hall effect devices, particularly those used in automotive environments.

II. Background Art

Electronic devices are an increasingly ubiquitous part of everyday life. Electronic devices and components are presently integrated in a large number of products, including products traditionally thought of as primarily mechanical in nature, such as automobiles. This trend is almost certain to continue. To successfully integrate electronic and mechanical components, some type of interface between the two technologies is required. Generally this interface is accomplished using devices such as sensors and actuators.

Position sensing is used to electronically monitor the position or movement of a mechanical component. The position sensor produces an electrical signal that varies as the position of the component in question varies. Electrical position sensors are an important part of innumerable products. For example, position sensors allow the status of various automotive actuations and processes to be monitored and controlled electronically.

A position sensor must be accurate, in that it must give an appropriate electrical signal based upon the position measured. If inaccurate, a position sensor will hinder the proper evaluation and control of the position of the component being monitored.

A position sensor must also be adequately precise in its measurement. The precision needed in measuring a position will obviously vary depending upon the particular circumstances of use. For some purposes only a rough indication of position is necessary. For instance, an indication of whether a valve is mostly open or mostly closed. In other applications more precise indication of position may be needed.

A position sensor must also be sufficiently durable for the environment in which it is placed. For example, a position sensor used on an automotive valve will experience almost constant movement while the automobile is in operation. Such a position sensor must be constructed of mechanical and electrical components which are assembled in such a manner as to allow it to remain sufficiently accurate and precise during its projected lifetime, despite considerable mechanical vibrations and thermal extremes and gradients.

In the past, position sensors were typically of the "contact" variety. A contacting position sensor requires physical contact between a signal generator and a sensing element to produce the electrical signal. Contacting position sensors typically consist of a potentiometer to produce electrical signals that vary as a function of the component's position. Contacting position sensors are generally accurate and precise. Unfortunately, the wear due to contact during movement of contacting position sensors has limited their durability. Also, the friction resulting from the contact can result in the sensor affecting the operation of the component. Further, water intrusion into a potentiometric sensor can disable the sensor.

One important advancement in sensor technology has been the development of non-contacting position sensors. As a general proposition, a non-contacting position sensor ("NPS") does not require physical contact between the signal generator and the sensing element. As presented here, an NPS utilizes magnets to generate magnetic fields that vary as a function of position and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and move relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of the contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag upon the component by the sensor. Because the NPS does not rely upon an electrical contact, there is reduced susceptibility to electrical shorting caused by water intrusion.

While the use of an NPS presents several advantages, there are also several disadvantages that must be overcome in order for an NPS to be a satisfactory position sensor for many applications. Magnetic irregularities or imperfections may compromise the precision and accuracy of an NPS. The accuracy and precision of an NPS may also be affected by the numerous mechanical vibrations and perturbations likely be to experienced by the sensor. Because there is no physical contact between the item to be monitored and the sensor, it is possible for them to be knocked out of alignment by such vibrations and perturbations. A misalignment will result in the measured magnetic field at any particular location not being what it would be in the original alignment. Because the measured magnetic field will be different than that when properly aligned, the perceived position will be inaccurate. Linearity of magnetic field strength and the resulting signal is also a concern.

Some of these challenges to the use of an NPS have been addressed in existing devices, most notably the device of U.S. Pat. No. 5,712,561 issued to MsCurley, et al and assigned to the CTS Corporation, herein incorporated by reference. There remains, however, a continuing need for a more precise determination of physical location of an item based upon the measured magnetic field at a location. Most particularly, a new type of non-contacting position sensor is needed for use in linear motion applications which displays minimal deviations due to changes in temperature and maximum linearity of the magnetic field.

SUMMARY OF THE INVENTION

The present invention provides a sensor for sensing the movement of an attached movable object. The sensor includes a first and second magnet located adjacent each other and attached to the movable object. Each magnet has a central portion that is thinner than both ends of the first and second magnets. A first and second pole piece has a first end and a second end. The first ends are located spaced apart in parallel relationship about the central portion. The second ends are located spaced apart. A first and second air gap is formed between the first ends and the magnets. A magnetic flux sensor is positioned between the second ends for sensing a variable magnetic field representative of the position of the attached movable object as the first and second magnets move. The first and second magnets have a first polarity on one side of the central portion and a substantially opposite second polarity on the other side of the central portion. The first and second magnets each have a slot in the central portions.

It is noted that the drawings of the invention are not to scale. The drawings are intended to depict only typical embodiments of the invention, and therefore should not be considered as limiting the scope of the invention. The invention will be described with additional specificity and detail through the accompanying drawings.

DESCRIPTION OF THE PREFERRED EMBODIMENT

Figure 1:
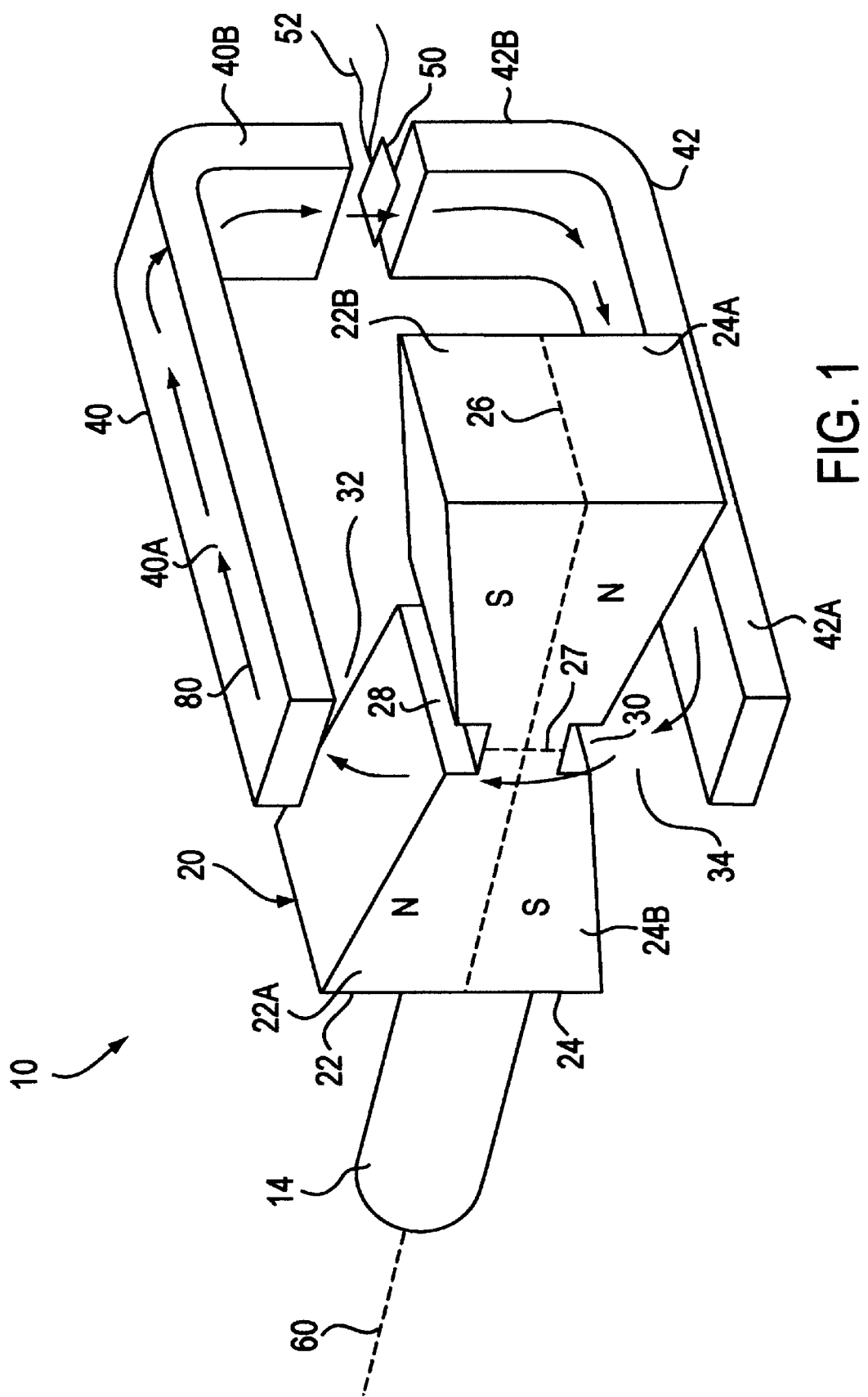
FIG. 1 is a perspective view of a linear position sensor using a bipolar tapered magnet.
Figure 2:
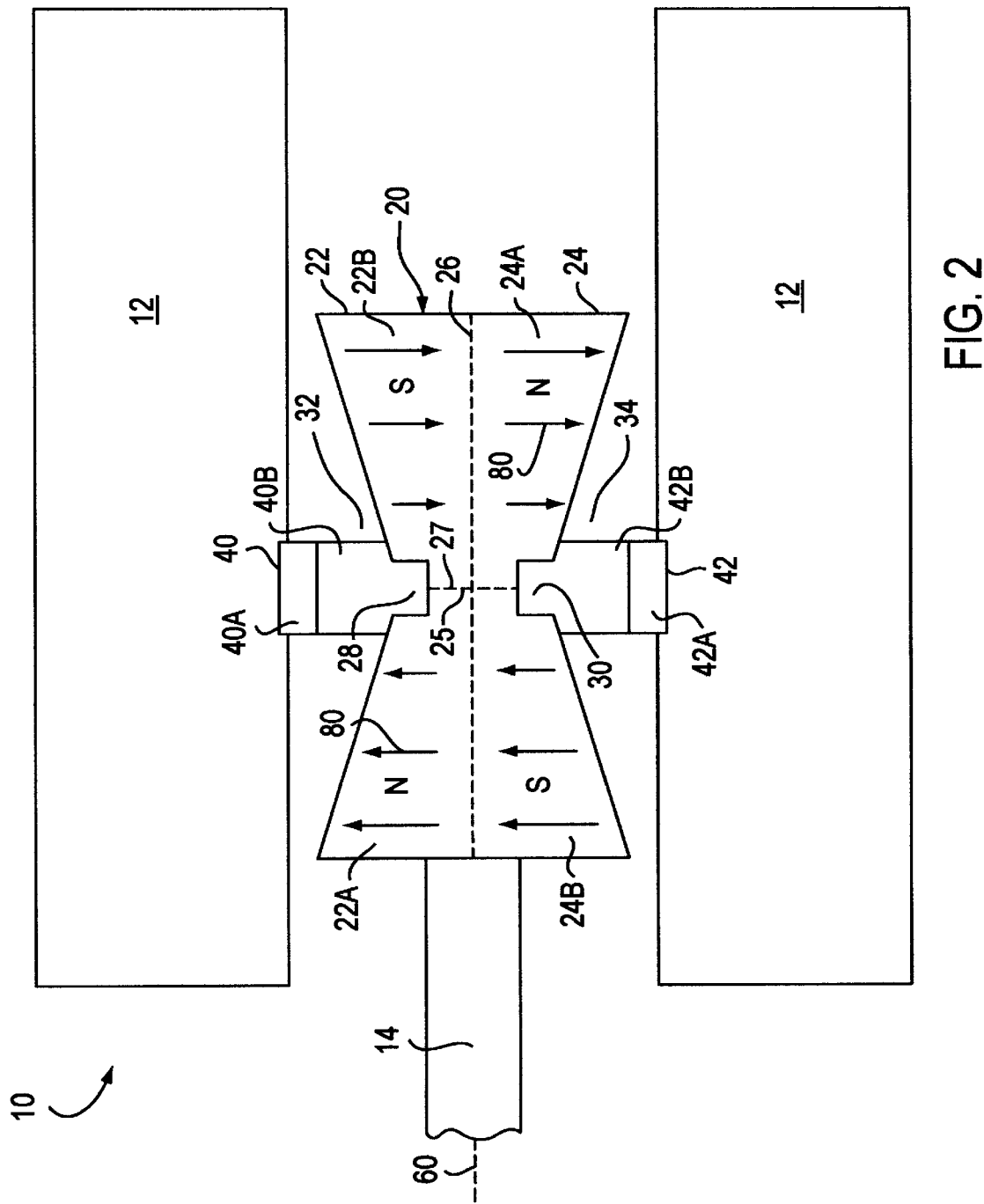
FIG. 2 illustrates a side view of FIG. 1.

FIGS. 1 and 2 illustrate a linear non-contacting position sensor (NPS) using a bipolar tapered magnet. The NPS of the preferred embodiment is particularly adapted for use in monitoring the linear position of a component. Sensor 10 includes a housing 12. A shaft 14 is attached to a bow tie shaped magnetic assembly 20. Shaft 14 is formed from a non-ferrous material such as a plastic. The magnetic assembly 20 includes an upper V-shaped tapered magnet 22 and a lower V-shaped tapered magnet 24. The magnets 22 and 24 have thick ends that taper to a central portion 25 that is thinner than the ends. Magnets 22 and 24 are separated by a transition region 26 where the polarity of the magnets changes. The magnets are formed of bonded ferrite or other magnetic material. Magnetic assembly 20 can be attached to a shaft 14 by an adhesive or by other means. Upper magnet 22 has a north polarity region 22A and a south polarity region 22B. Lower magnet 24 has a north polarity region 24A and a south polarity region 24B. The north polarity regions 22A and 24A are seperated from the south polarity regions 22B and 24B by a transition region 27 where the polarity of the magnets changes.

Magnet 22 has an upper slot 28 and magnet 24 has a lower slot 30 formed therein. Slots 28 and 30 are located at the narrow part of magnetic assembly 20. An upper air gap 32 is formed in the area between the V of upper magnet 22 above slot 28. Similarly, a lower air gap 34 is formed in the area between the V of lower magnet 24 below slot 30. As shall be described more fully below, the magnets create a magnetic field that varies in a substantially linear fashion as the magnets are moved along axis 60.

An L shaped upper pole piece 40 and an L shaped lower pole piece 42 are held by housing 12. Pole piece 40 has a first arm 40A and a second arm 40B. Pole piece 42 has a first arm 42A and a second arm 42B. Pole pieces 40 and 42 are made from a magnetically permeable material such as stainless steel and may be insert molded to the housing. Pole pieces 40 and 42 conduct magnetic flux 80 from the magnets in a loop. Flux 80 originating in magnet 22A travels across gap 32, through pole piece 40, hall device 52, pole piece 42, gap 34 and magnet 24B completing the loop.

A magnetic flux sensor, such as a Hall effect device 50 is located between second arms 40B and 42B. The Hall effect device 50 is carried upon a hybrid circuit substrate or printed circuit board (not shown). Wire leads 52 are connected to Hall effect device to connect with a hybrid circuit substrate or printed circuit board. The hall effect device is preferably be positioned toward the center of the arms 40B and 42B to avoid edge irregularities in the magnetic field created by the magnets. The Hall effect device 50 and pole pieces 40 and 42 are stationary while the magnets 22 and 24 move along axis 60. The hall effect device and pole pieces are contained within housing 12.

As the magnetic field strength generated by the magnets and detected by the Hall effect device varies with linear motion, the signal produced by the Hall effect device changes accordingly, allowing the position of the attached object to be monitored to be ascertained.

Magnets 22 and 24 produces a varying magnetic flux field as indicated by flux density vectors 80. The polarity of the magnetic field generated by the magnet 22A is indicated by the upward direction of the vectors 80. Likewise, the strength of the magnetic flux field is indicated by the length of the vectors. The magnetic flux field generated by the magnet 22A decreases in strength from the thick end to slot 28. Magnets 22B, 24A and 24B are similarly designed as illustrated.

Upper and lower slots 28 and 30 increase the linearity of the magnetic field within airgaps 32 and 34. As a practical matter, the thin end of a magnet will always have a finite thickness and generate a non-zero magnetic field. If the thin ends of two magnets having opposite polarities are immediately adjacent, there will be a discontinuity of the combined magnetic field about the center of the air gaps. By providing a slot between adjacent thin ends of the tapered magnets, this discontinuity and other problems affecting linearity of sensor output may be avoided. Further, slots 28 and 30 allow for a consistent neutral zone, about the center of the slots, independent of magnetizing property variations, which aids linearity of sensor output. The slots 28 and 30 may be created during the molding of the magnet. If the magnets are formed individually, the gaps may be formed by appropriately positioning individual magnets. Alternatively, magnetic material may be removed to create the gaps after the magnets have been formed.

A magnetic flux sensor such as a Hall effect device 50 is positioned between arms 40B and 42B. Motion of shaft 14 causes relative movement between the magnets 22 and 24 and the pole pieces 40 and 42. The magnetic field in the pole pieces is the sum of the magnetic fields generated by the magnet regions 22A, 22B, 24A, and 24B. The polarity and strength of the combined magnetic field varies along axis 60.

The magnetic field detected by the Hall effect device 52 as magnets 22 and 24 move along axis 60 will be large and in an upward direction at the thick ends of magnet regions 22A and 24B and decrease substantially linearly as it approaches slots 28 and 30, at which point the magnetic field will be substantially zero. As the magnets continue to move along axis 60, the polarity of the magnetic field detected reverses with substantially linearly increasing magnitude.

This variance of magnetic field polarity and strength as a function of a linear position causes the electrical output signal from hall device 50 to vary. The signal changes substantially linearly from a large positive signal at the thick ends of regions 22A and 24B, passes through zero at slots 28 and 30 and becomes a large negative signal at the thick ends of magnet regions 22B and 24A. The signal produced by the Hall effect device 50 is proportional to the magnetic flux density carried by the pole pieces 40 and 42. The magnet polarity directions could be reversed, if desired, resulting in a signal of opposite slope. The output could be offset to yield a positive voltage a both thick ends, from +0.5 to +4.5 volts for example.

The present invention is useful for measuring the linear movement of an attached object. The position sensor has improved linearity of magnetic field and the resulting signal as well as decreased signal variance due to temperature changes. This results from the movement of the magnets, about the center of the slots 28 and 30. This is also called the zero Gauss, point. This improves the ability of the sensor to compensate for temperature changes by eliminating previously needed circuitry and additional processing complexities. The position sensor in accordance with the present invention may be affixed to the object to be monitored in any appropriate fashion.

It is to be appreciated that numerous variations from the example embodiments described herein may be made without parting from the scope of the invention. The magnets themselves may be individual magnets, or may be magnetic portions of larger magnets. The magnet gaps between the thin ends of adjacent magnets or magnet regions may be formed in any of a variety of ways. The precise type of apparatus the position sensor is attached to is immaterial to the present invention. Likewise, the particular type and variety of magnetic flux density sensor used in connection with a non-contacting position sensor in accordance with the present invention is immaterial. A variety of mechanisms may be used to connect the magnet assembly to the object to be monitored. The electrical connections and the methods of establishing them may vary from those shown in accordance with the preferred embodiment. One skilled in the art will likewise readily ascertain numerous other variations that may easily be made without departing from the spirit and scope of the present invention.

What is claimed is:

1. A sensor for sensing movement of an attached movable object, comprising:
   a) a first and second tapered magnets positioned adjacent each other and attached to the movable object, each magnet having a central portion that is thinner than both ends of the first and second magnets;
   b) a first and second pole piece, each having a first end and a second end, the first ends located spaced apart in parallel relationship about the central portion, the second ends located spaced apart;
   c) a first and second air gap formed between the first ends and the magnets; and
   d) a magnetic flux sensor positioned between the second ends for sensing a variable magnetic field representative of the position of the attached movable object.

2. The sensor of claim 1, wherein the first and second magnets each have a first polarity on one side of the central portion and a second polarity on the other side of the central portion.

3. The sensor of claim 2, wherein the first and second magnets each have a slot in the central portion.

4. The sensor of claim 2, wherein the magnetic flux sensor comprises a Hall effect device.

5. The sensor of claim 1, wherein the magnets have a bowtie shape.

6. The sensor of claim 1, wherein the sensor measures linear motion.

7. A non-contacting position sensor comprising:
   a) a first and second magnetically polarized magnet disposed adjacent each other and each having a pair of thick ends and a thin central portion, the thickness of each magnet increases substantially linearly from the central portion to the thick ends, one of the thick ends having a first polarity and the other thick end having a second polarity, the magnets attached to a movable object;
   b) a first and second pole piece, each having a first end and a second end, the first ends located spaced apart in parallel relationship about the central portion, the second ends located spaced apart; and
   c) a magnetic flux sensor positioned between the second ends for sensing a variable magnetic field representative of the position of the attached movable object.

8. The sensor of claim 7, wherein the first and second pole pieces are constructed of a magnetically permeable material.

9. The sensor of claim 7, wherein the first and second magnets each have a slot in the central portions.

10. The sensor of claim 7, wherein the magnetic flux sensor is a Hall effect device.

11. The sensor of claim 7, wherein the magnets form a bowtie shape.

12. The sensor of claim 8, wherein the first and second pole pieces are L shaped.

13. The sensor of claim 7, wherein the sensor is enclosed in a housing.

14. A sensor for sensing movement of an attached movable object, comprising:
   a) a bowtie shaped magnet having a pair of thick ends and a thinner central portion;
   b) a first and second pole piece, each having a first end and a second end, the first ends located spaced apart in parallel relationship about the central portion, the second ends located spaced apart, the first and second pole pieces attached to the moveable object;
   c) a magnetic flux sensor positioned between the second ends for sensing a variable magnetic field representative of the position of the attached movable object as the moveable object moves.

15. The sensor of claim 14, wherein the bowtie shaped magnet comprises a first and second magnet each having a first polarity on one side of the central portion and a second polarity on the other side of the central portion.

16. The sensor of claim 15, wherein the first and second magnets each have a slot in the central portion.

17. The sensor of claim 16, wherein a first and second air gap is formed between the first ends and the magnets.

18. The sensor of claim 17, wherein the magnetic flux sensor is a hall effect device, the hall effect device connected by a wire to an external electrical circuit.

* * * * *